United States Patent [19]
Manaka et al.

[11] Patent Number: 5,992,143
[45] Date of Patent: Nov. 30, 1999

[54] CONTROL DEVICE FOR INTERNAL COMBUSTION ENGINE

[75] Inventors: Toshio Manaka, Hitachinaka; Takashi Shiraishi, Ibaraki-ken, both of Japan

[73] Assignee: Hitachi, Ltd., Tokyo, Japan

[21] Appl. No.: 08/769,220

[22] Filed: Dec. 18, 1996

[30] Foreign Application Priority Data

Jan. 18, 1996 [JP] Japan .................................. 8-006317

[51] Int. Cl.⁶ ....................................................... F01N 3/00
[52] U.S. Cl. ................................ 60/284; 60/285; 60/286; 60/276
[58] Field of Search ............................ 60/274, 284, 285, 60/286, 276

[56] References Cited

U.S. PATENT DOCUMENTS

| | | | |
|---|---|---|---|
| 5,211,010 | 5/1993 | Hirota | 60/285 |
| 5,293,741 | 3/1994 | Kashiyama et al. | 60/284 |
| 5,560,202 | 10/1996 | Hosoya et al. | 60/285 |
| 5,584,176 | 12/1996 | Meyer et al. | 60/274 |
| 5,600,949 | 2/1997 | Kato et al. | 60/286 |

FOREIGN PATENT DOCUMENTS

| | | |
|---|---|---|
| A-6-257488 | 9/1934 | Japan . |
| A-5-106493 | 4/1993 | Japan . |
| A-5-106494 | 4/1993 | Japan . |
| A-5-98945 | 4/1993 | Japan . |
| A-5-98947 | 4/1993 | Japan . |
| A-5-98948 | 4/1993 | Japan . |
| A-5-98949 | 4/1993 | Japan . |
| A-5-163989 | 6/1993 | Japan . |
| A-5-180043 | 7/1993 | Japan . |
| A-6-257546 | 9/1994 | Japan . |

Primary Examiner—Thomas E. Denion
Attorney, Agent, or Firm—Antonelli, Terry, Stout & Kraus, LLP

[57] ABSTRACT

An internal combustion engine control device having exhaust gas sensors provided before and after a catalyst or after the catalyst, a processor for signals from the exhaust gas sensors, and an electronic controller. The electronic control is arranged for controlling the amount of fuel to be fed to the internal combustion engine, ignition timing, the amount of secondary air for reducing the emission, the amount of EGR (exhaust gas recirculation), electrically heated catalyst, assisted air flow, and gas flow in the cylinders or intake exhaust valve timing of internal combustion engine. Using the controller the conversion rate (degree of activation) is detected with high precision from the processed sensor signals, and the emission is most suitably controlled to be reduce according to the degree of activation in order to meet both present stringent exhaust gas regulations and those which are predicted for the future.

4 Claims, 12 Drawing Sheets

FIG. 6A
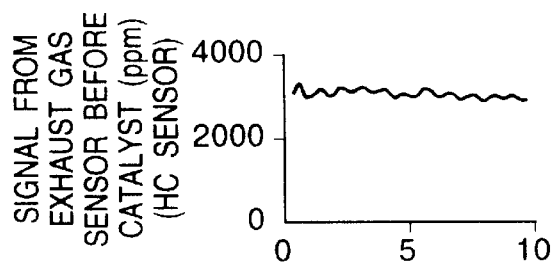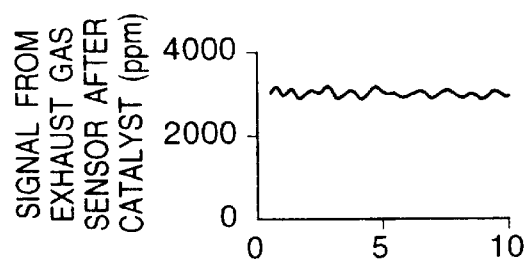
FIG. 6B
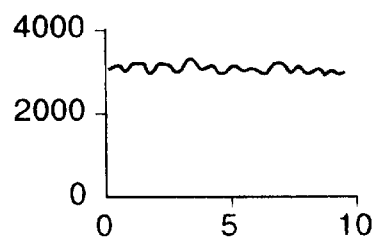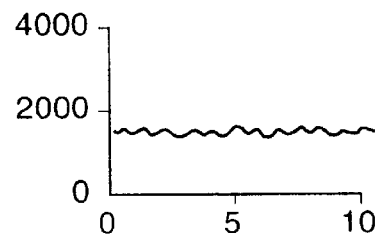
FIG. 6C
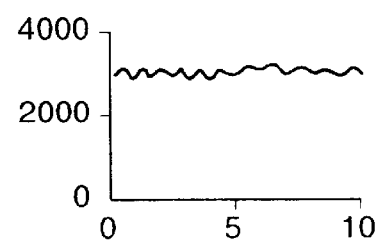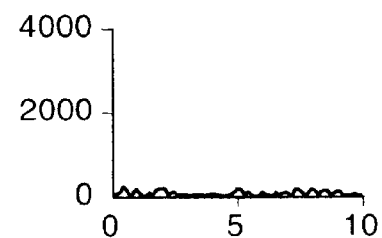

CONTROL DEVICE FOR INTERNAL COMBUSTION ENGINE

BACKGROUND OF THE INVENTION

The present invention relates to electronic control devices for controlling fuel to be fed to an internal combustion engine, ignition timing, secondary air flow rate for reduction of harmful exhaust gas, or emission, EGR rate, electrically heated catalyst, assisted air flow rate, gas flow intensity (swirl/tumble intensity) within cylinder and timing of inlet exhaust valves of engine, and particularly to a method of controlling these factors on the basis of signals from exhaust gas sensors provided downstream or upstream and downstream relative to a catalyst.

In the prior art, as disclosed in Japanese Patent Laid-open Gazette No. 6-257488, activation decision are made based on catalyst temperature sensors, and if activation is not made, fuel to one cylinder is cut (secondary air effect), so that the catalyst can be quickly warmed up for reduction of the emission. Also, as disclosed in Japanese Patent Laid-open Gazette No. 6-257546, ignition timing is retarded in accordance with the difference between exhaust temperatures before and after the catalyst, so that exhaust gas temperature can be increased to quickly warm up the catalyst for reduction of the emission. The catalyst deterioration judgement by signals from exhaust gas sensors before and after catalyst is described in Japanese Patent Laid-open Gazettes Nos. 5-98945, 5-98947, 5-98948, 5-98949, 5-106493, 5-106494, 5-163989, and 5-180043.

It was found that the above-given conventional methods and devices could not meet the present stringent emission regulations. Particularly when the engine is started from a cold condition at ordinary temperature, the effect of reducing the amount of the emission is not enough until the catalyst is activated from the start of engine.

SUMMARY OF THE INVENTION

Accordingly, it is an object of the invention to provide a control device that is able to sufficiently reduce the emission from a cooled engine, and which has an emission reducing effect sufficient to meet the present exhaust gas regulation and the exhaust gas regulations predicted in the future.

This control device has exhaust gas sensors provided upstream relative to a catalyst or upstream and downstream relative to the catalyst, processing means for processing the signals from the exhaust gas sensors, and control means for controlling the amount of fuel to be fed to the internal combustion engine, ignition timing, the amount of secondary air for reducing the emission, the amount of EGR (exhaust gas recirculation), electrically heated catalyst, assisted air flow, and gas flow in cylinder or intake exhaust valve timing of internal combustion engine on the basis of the processed signal values.

In other words, according to the invention, there is an internal combustion engine control device having a catalyst for purifying exhaust gas, or emission, exhaust gas sensors provided downstream relative to the catalyst or upstream and downstream relative to the catalyst, and means for detecting the conditions of the catalyst on the basis of the output of the exhaust gas sensor provided downstream or the outputs of the exhaust gas sensors provided upstream and downstream, wherein until the catalyst is fully activated after the start of the engine, a first engine condition changing means is operated to change the running conditions of the internal combustion engine or the combustion conditions of the engine in the direction for quickly warming up the activation of the catalyst, for increasing the purification rate, or conversion rate of the catalyst or for reducing the emission exhausted from the engine in accordance with the condition of the catalyst detected by the exhaust gas sensors, and when the catalyst conditions do not reach a certain desired condition even after the implementation of the first engine condition changing means, second engine condition changing means and so on are orderly implemented in order to make the catalyst reach or approach the desired condition.

According to another aspect of the invention, there is provided an internal combustion engine control device having a catalyst for purifying exhaust gas, or emission, exhaust gas sensors provided downstream relative to the catalyst or upstream and downstream relative to the catalyst, and means for detecting the conditions of the catalyst on the basis of the output of the exhaust gas sensor provided downstream or the outputs of the exhaust gas sensors provided upstream and downstream, wherein until the catalyst is fully activated after the start of the engine, orderly control is made on ignition timing, air fuel ratio, secondary air, electrically heated catalyst, assisted air injector for promoting atomization of fuel injection, EGR (exhaust gas recirculation), gas flow in cylinder or intake exhaust valve timing of internal combustion engine in the direction for quickly warming up the activation of the catalyst, for increasing the purification rate, or conversion rate of the catalyst or for reducing the emission exhausted from the engine in accordance with the condition of the catalyst detected by the exhaust gas sensors.

BRIEF DESCRIPTION OF THE DRAWINGS

FIGS. 6A to 6C are graphs showing the relations between catalyst conversion rate and exhaust gas sensor (HC sensor) signal;

DETAILED DESCRIPTION OF THE PREFERRED EMBODIMENTS

An embodiment of the invention will be described with reference to the accompanying drawings.

Figure 1:
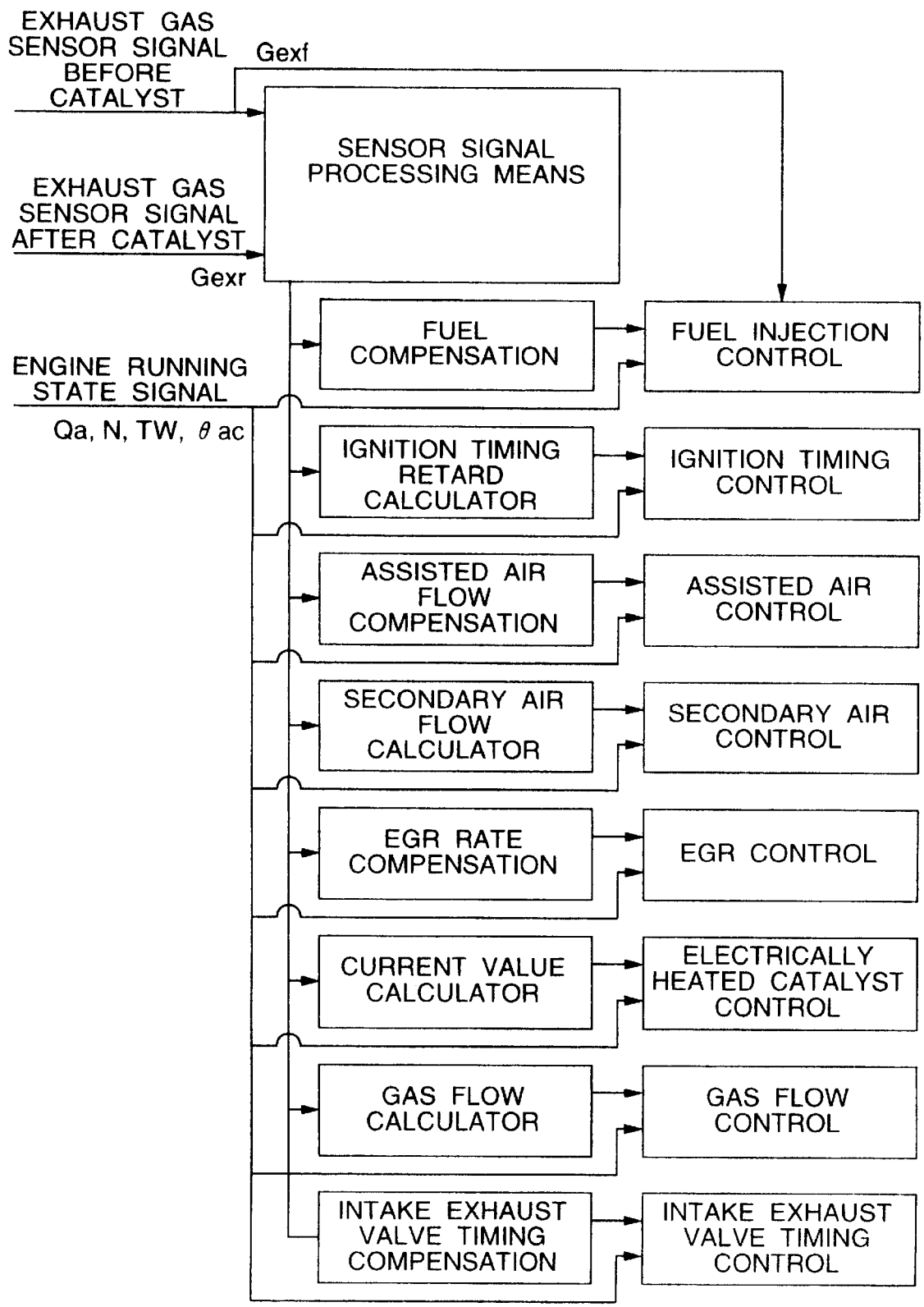
FIG. 1 is a block diagram of the control flow of an embodiment of a control device of the invention.

FIG. 1 is a block diagram of one embodiment of the invention. A signal $G_{exf}$ from an exhaust gas sensor located upstream relative to the catalyst, or before the catalyst and a signal $G_{exr}$ from an exhaust gas sensor located downstream relative to the catalyst, or after the catalyst are supplied to sensor signal processing means, where activation of the catalyst is calculated. The activation of the catalyst may be replaced by the correlation factor of the successive exhaust gas sensor signals, response and exhaust gas reduction rate relating to the activation of the catalyst. In addition, air fuel ratio compensation, ignition timing retard, assisted air compensation, secondary air flow, EGR rate, catalyst current flow, gas flow intensity, and intake exhaust valve timing compensation of engine are calculated in accordance with the value produced from the sensor signal processing means. These values are used for controlling the internal combustion engine.

Figure 2:
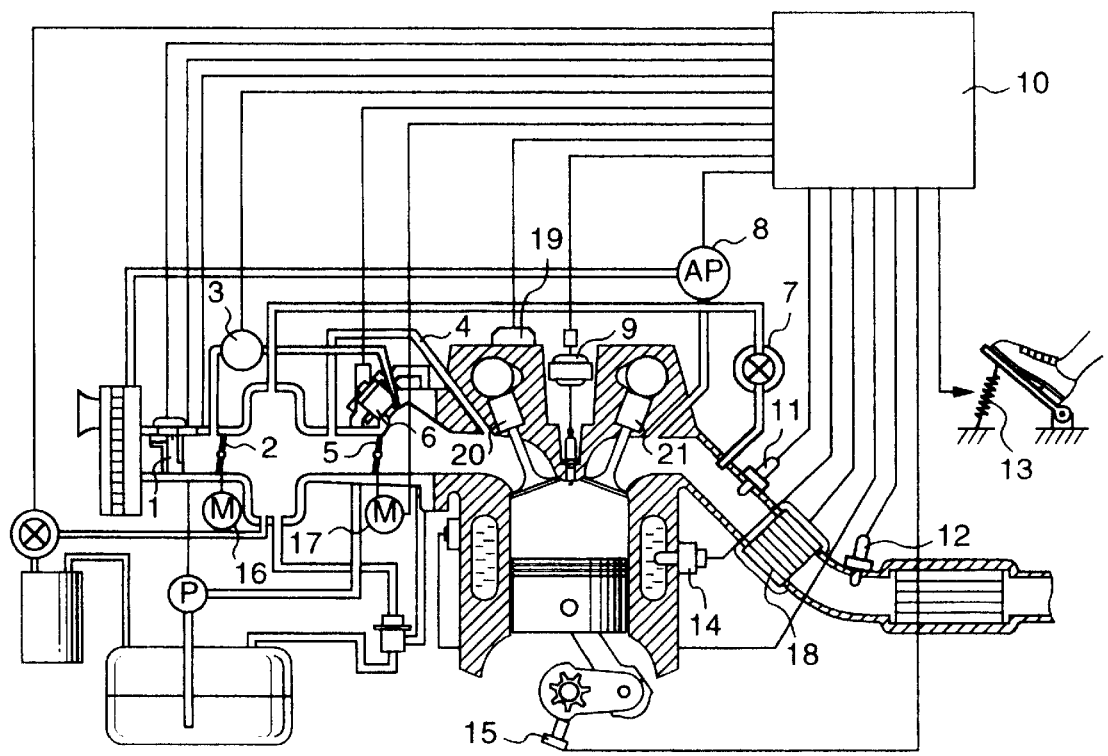
FIG. 2 shows a schematic arrangement of the control device of the embodiment of the invention.

FIG. 2 is a systematic diagram of the embodiment of the invention. The intake air flow rate $Q_a$ of engine, engine speed N, and engine coolant temperature TW are detected by an air flow sensor 1, an engine speed sensor 15 and a water temperature sensor 14 and an accelerator pedal sensor 13. The air fuel ratio of exhaust gas before and after the catalyst is detected by an exhaust gas sensor 11 and an exhaust gas sensor 12. An electronic throttle actuator 16 acts to open and close a throttle valve 2 on the basis of the accelerator pedal sensor signal 13. Thus, the power output can be adjusted by varying the air flow into the engine. The fuel is injected from an injector 6, and an air jet for improvement of fuel atomization is fed to the nozzle of the injector 6 from an assisted air control valve 3. The assisted air control valve 3 may be replaced by an air pump for assisted air. The gas flow control within the cylinders of the engine is performed by opening and closing a throttle valve 5 by a gas flow actuator 17 thereby to adjust the air flow through a gas flow generation passage 4. The air injected through the gas flow generation passage 4 energetically flows into the cylinder, causing tumble and swirl within the cylinder. Thus, the fuel liquid film within the cylinder can be reduced. At the same time, combustion is also improved, and thus the harmful exhaust gas, or the emission can be reduced. Ignition within the cylinder is made by an ignition coil 9. The emission can be reduced by retarding the ignition timing, and the catalyst can be quickly warmed up since the exhaust gas temperature is increased. By introducing air from a secondary air pump 8 into an exhaust pipe, it is possible to burn the unburned gas, and promote the reaction within the catalyst to warm up catalyst quickly. An EGR control valve 7 reduces combustion temperature to decrease the amount of exhaustion of $NO_x$ by introducing exhaust gas to the inlet tube side of the engine. An inlet valve 20 and an exhaust valve 21 are controlled to open and close by a valve timing actuator 19, thereby reducing the amount of harmful exhaust gas. A catalyst 18 acts to purify the emission, and it has the characteristic shown in FIG. 3. A control unit 10 controls each actuator on the basis of the sensor signals. The exhaust gas sensors 11 and 12 are respectively provided before and after the catalyst 18 (upstream and downstream) to detect air fuel ratio of exhaust gas and gas concentration. When the catalyst is activated to increase the purification factor, or conversion rate, oxidizing, reducing and sucking actions within the catalyst become active, making the variation of the air fuel ratio and concentration of exhaust gas retard after passing through the catalyst as compared with those before the catalyst. FIGS. 4A, 4B and 4C, FIGS. 5A, 5B and 5C and FIGS. 6A, 6B and 6C show the changes of the exhaust gas sensor signal after and before the catalyst when the air fuel ratio varies at around a stoichiometric mixture ratio.

Figure 3:
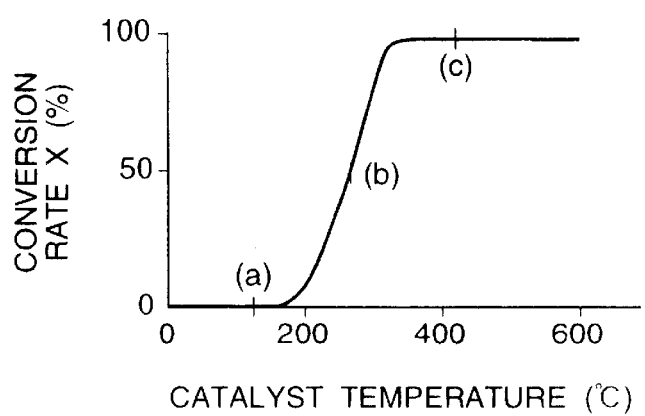
FIG. 3 is a graph showing the relation between catalyst temperature and catalyst purification rate, or conversion rate.
Figure 4A:
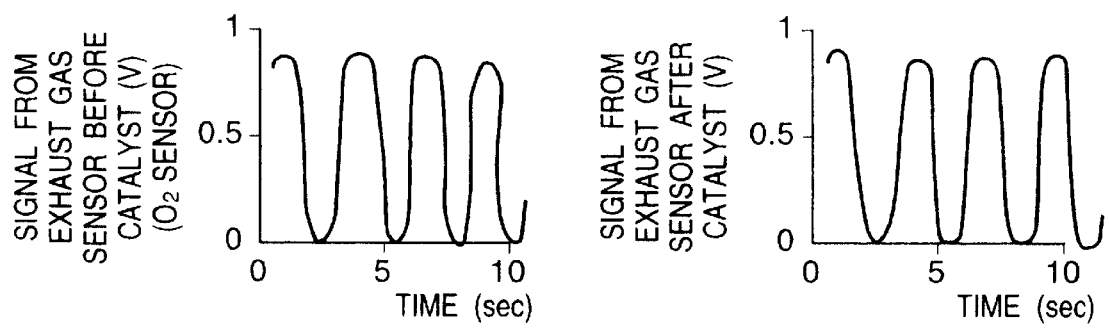
FIGS. 4A to 4C are graphs showing the relations between catalyst conversion rate and exhaust gas sensor ($O_2$ sensor) signal.
Figure 4B:
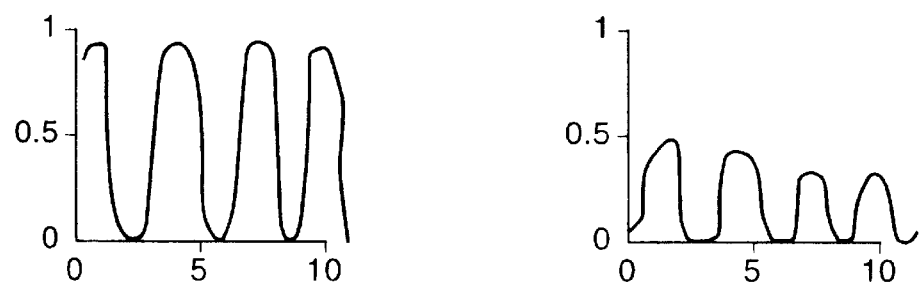
Figure 4C:
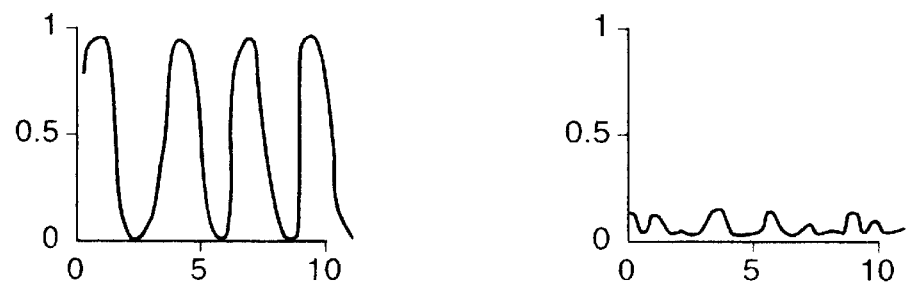
Figure 5A:
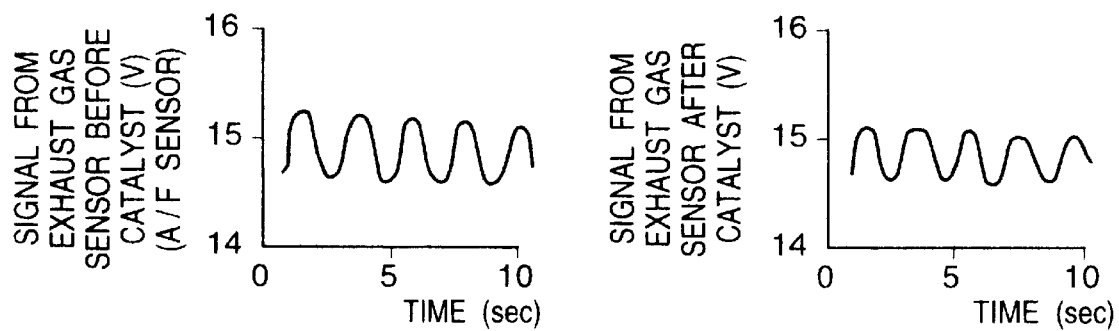
FIGS. 5A to 5C are graphs showing the relations between catalyst conversion rate and exhaust gas sensor (A/F sensor) signal.
Figure 5B:
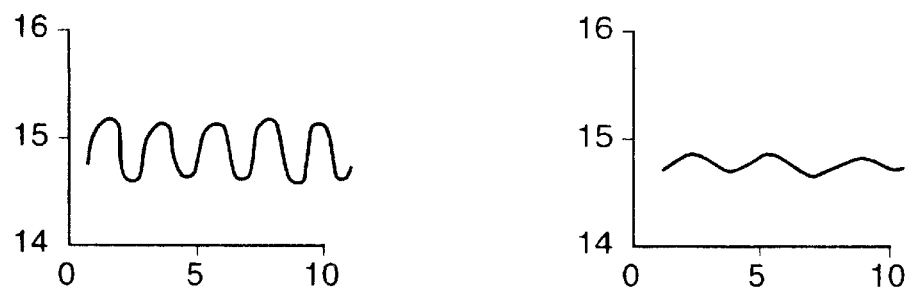
Figure 5C:
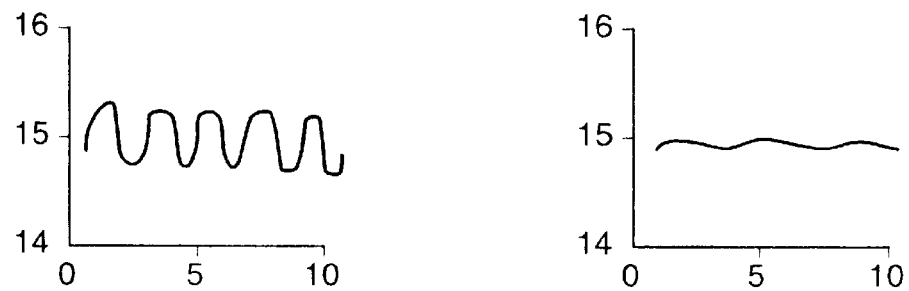
Figure 7:
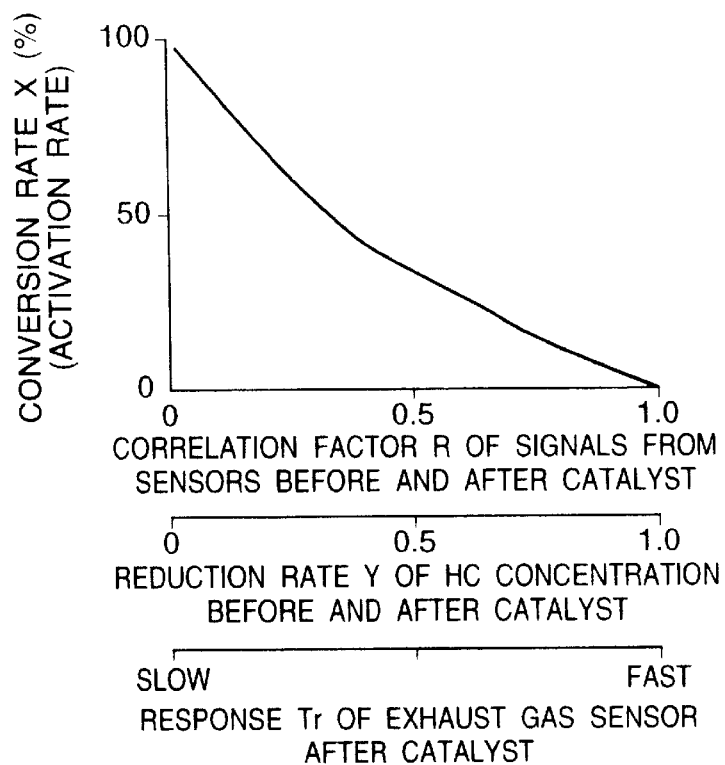
FIG. 7 is a graph showing the relation between catalyst conversion rate (activation rate) and correlation factor of exhaust gas sensor signal.

From FIG. 3, which illustrates the conversion rate characteristic of the catalyst, it will be seen that the purification rate, or conversion rate is increased from (a) to (b) and (c) with the increase of the catalyst temperature. The change of the exhaust gas sensor signal after and before the catalyst for conversion ratios (a), (b) and (c) are shown in FIGS. 4A to 4C, FIGS. 5A to 5C and FIGS. 6A to 6C. For the results in FIGS. 4A to 4C, an $O_2$ sensor is used for producing 0.8 V for richer air fuel ratio than the stoichiometric mixture ratio, and 0 V for leaner air fuel ratio than the stoichiometric mixture ratio. For the results in FIGS. 5A to 5C, an A/F sensor is used for linearly detecting the air fuel ratio. For the results in FIGS. 6A to 6C, an HC sensor is used for detecting HC (hydrocarbon) concentration. From FIGS. 4A to 4C and FIGS. 5A to 5C, it will be seen that the exhaust gas sensor signal after catalyst is reduced in its amplitude and varies more slowly with the increase of the conversion rate of catalyst. Thus, the conversion rate and activation rate can be quantitatively decided by this difference. In addition, from FIGS. 6A to 6C, it will be understood that the HC concentration after catalyst is decreased with the increase of the conversion rate of catalyst. FIG. 7 shows one example of the relation between the exhaust gas sensor signal and the conversion rate of the catalyst (activation rate).

Figure 8:
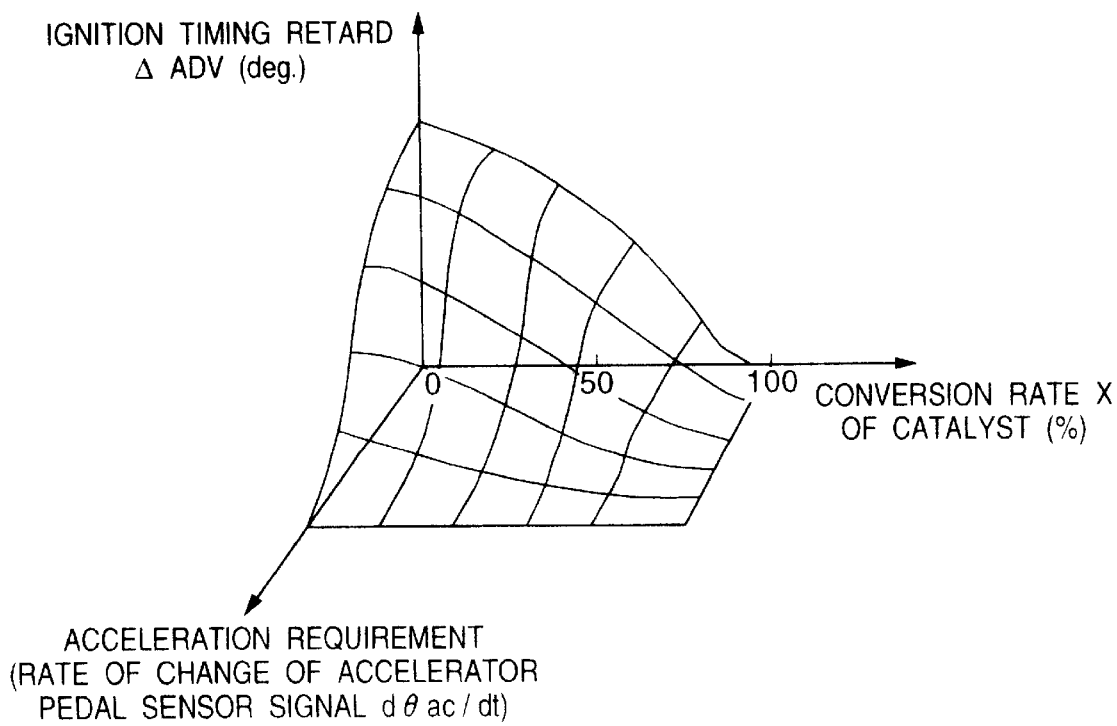
FIG. 8 is a graph showing the ignition timing retardation characteristic in this invention.
Figure 9A:
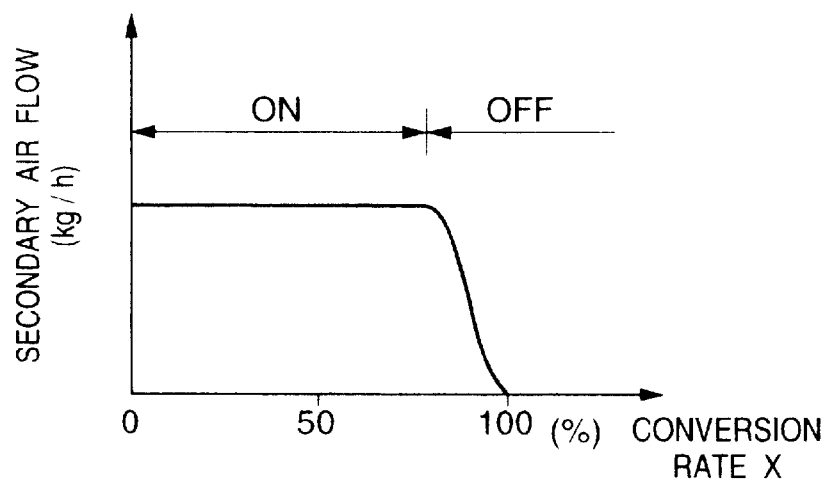
FIGS. 9A and 9B are graphs showing the secondary air flow characteristic in this invention.
Figure 9B:
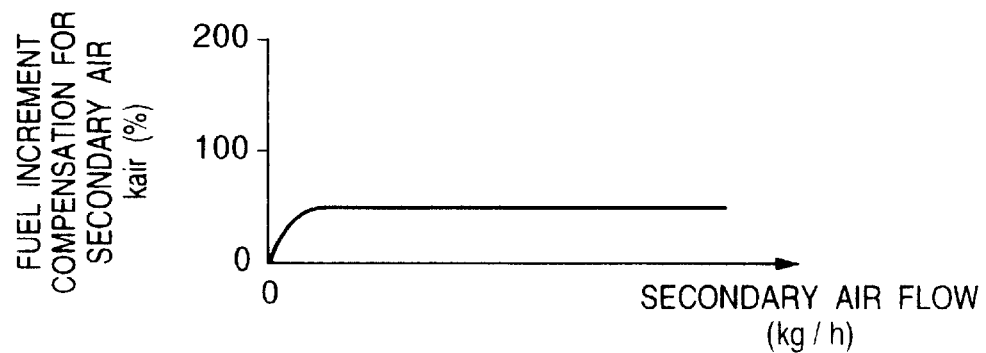
Figure 10:
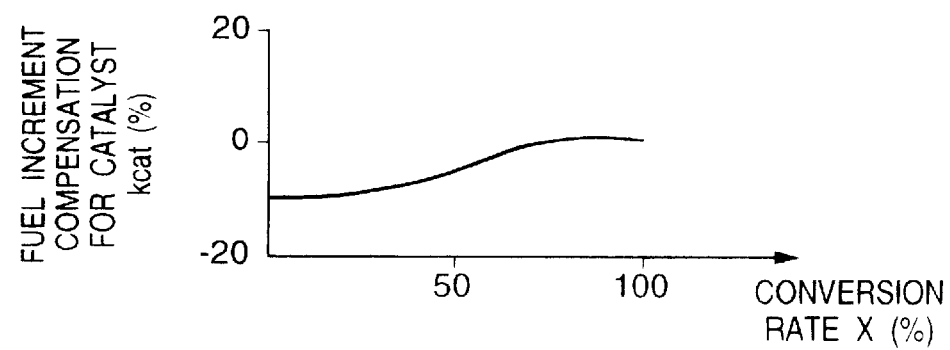
FIG. 10 is a graph showing the fuel compensation for catalyst in this invention.
Figure 11:
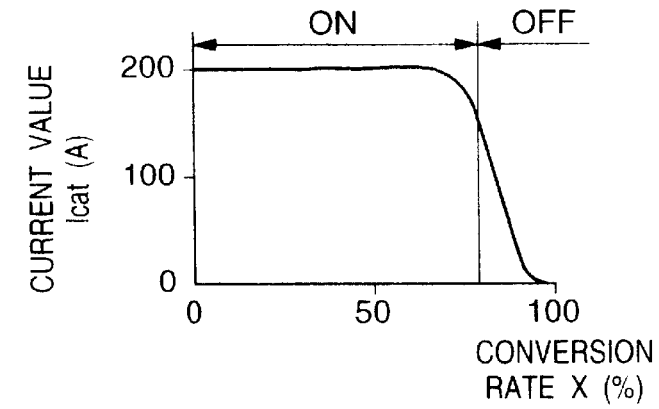
FIG. 11 is a graph showing the relation between catalyst current flow and catalyst conversion rate in this invention.
Figure 12:
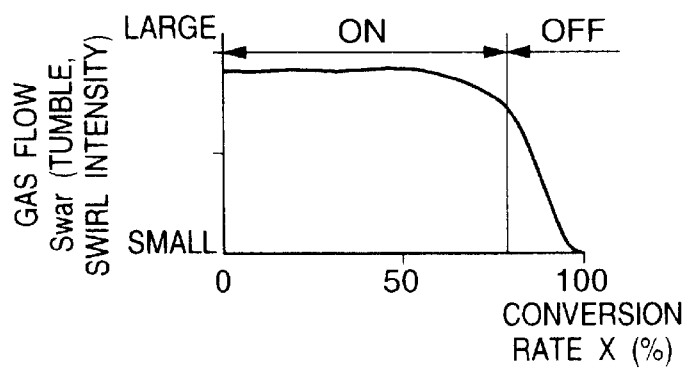
FIG. 12 is a graph showing the gas flow characteristic in this invention.
Figure 13:
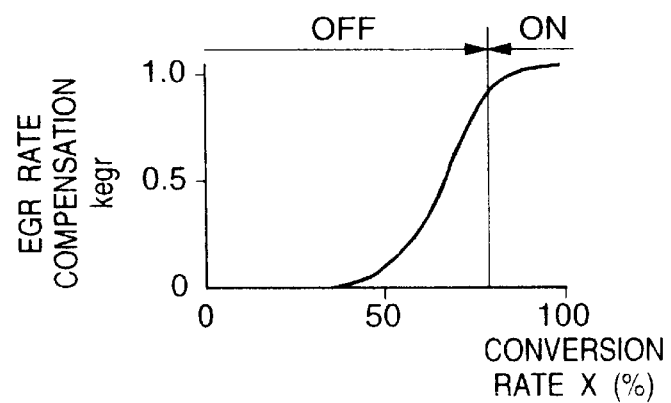
FIG. 13 is a graph showing the EGR rate compensation characteristic in this invention.
Figure 14:
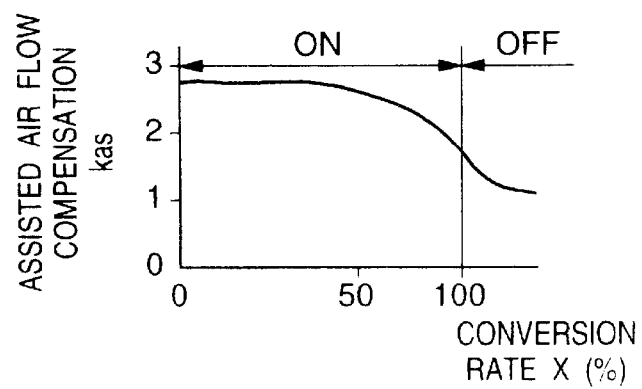
FIG. 14 is a graph showing the assisted air flow rate compensation characteristic in this invention.
Figure 15:
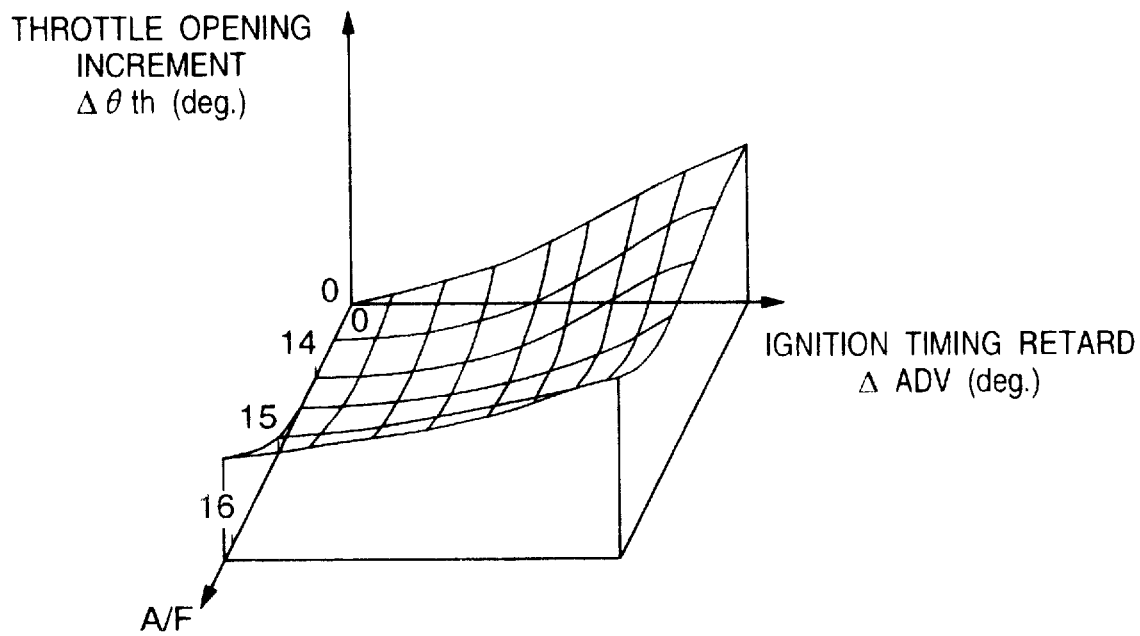
FIG. 15 is a graph showing the throttle opening angle compensation characteristic in this invention.
Figure 16:
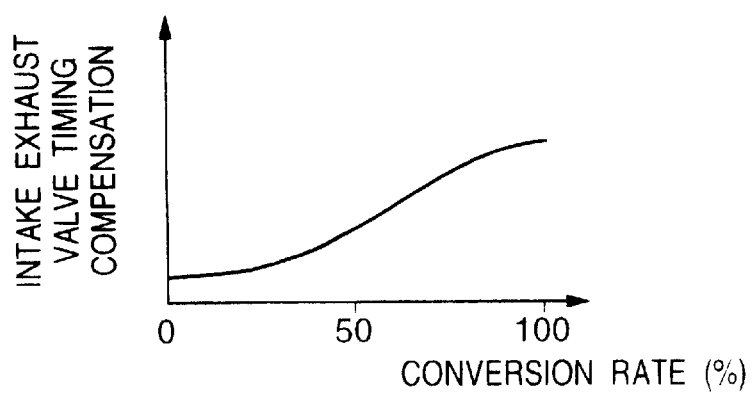
FIG. 16 is a graph showing the intake, exhaust valve timing compensation characteristic in this invention.

FIG. 8 illustrates the ignition timing retard $\Delta$ ADV characteristic that is determined by catalyst conversion rate X and acceleration requirement ($d\Theta_{ac}/dt$). FIGS. 9A and 9B show the secondary air flow characteristic determined by catalyst conversion rate X and the fuel increment compensation characteristic determined by secondary air flow. FIG. 10 shows the fuel compensation characteristic depending on catalyst conversion rate X, FIG. 11 the current value characteristic for the current in the catalyst, and FIG. 12 the gas flow characteristic. FIG. 13 shows the EGR flow compensation characteristic, and FIG. 14 the assisted air flow rate characteristic. FIG. 15 shows the throttle opening angle increment $\Delta \Theta_{th}$ characteristic. FIG. 16 shows the intake, exhaust valve timing compensation characteristic. Timing correction is made to reduce the amount of the emission with the decrease of catalyst conversion rate X.

The characteristics illustrated in FIGS. 8 to FIG. 16 are only examples.

For example, although in FIGS. 9A and 9B, FIG. 11 and FIG. 12, the secondary air flow, current $I_{cat}$ and gas flow $S_{war}$ are constant when the catalyst conversion rate X is in a certain range of values, those characteristics exhibit certain gradients, stair step waveforms and so on depending on the system, with respect to catalyst conversion rate X.

Figure 17:
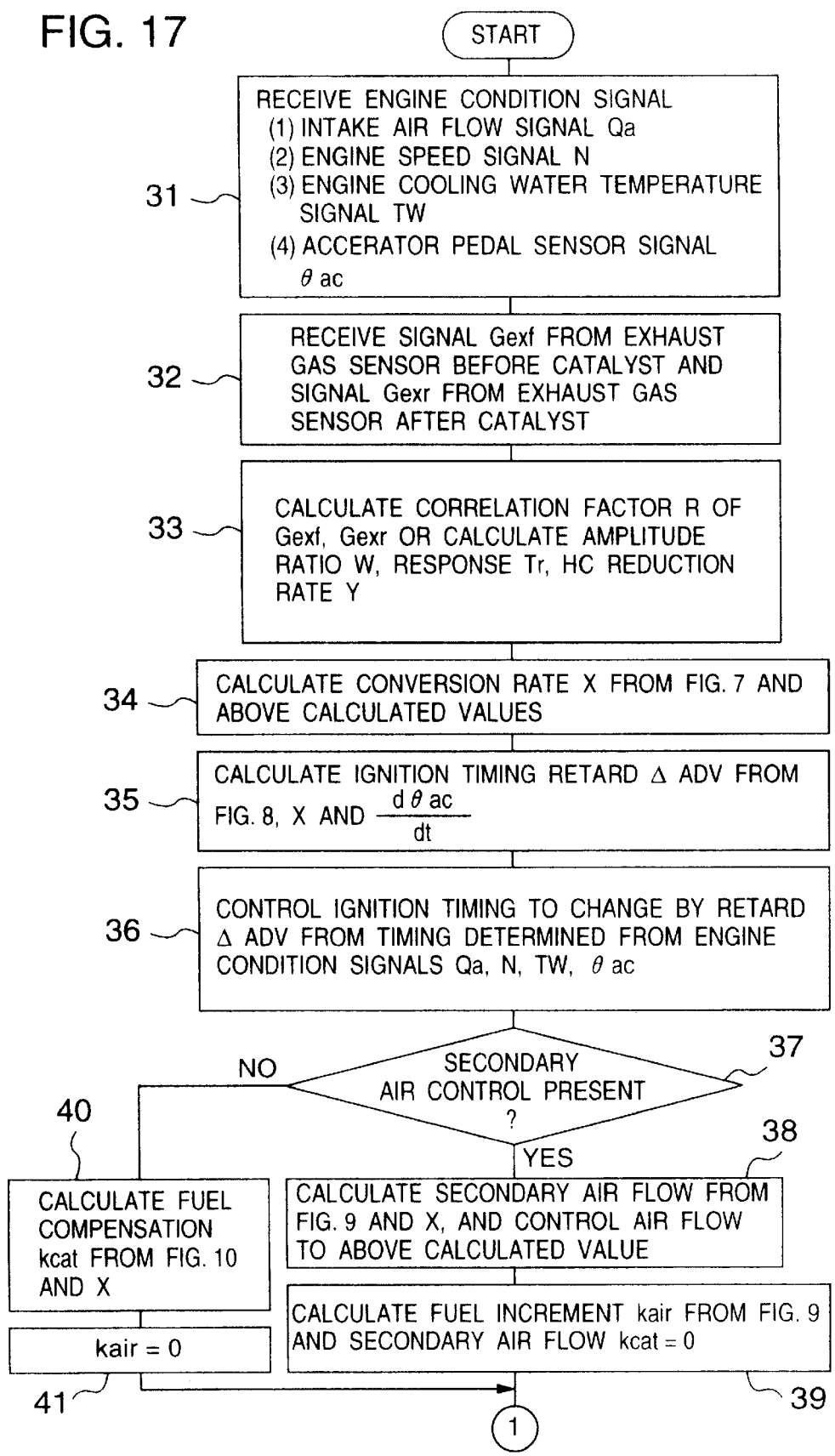
FIG. 17 is a part of the flowchart for the operation of the controlling device for internal combustion engine according to the invention.
Figure 18:
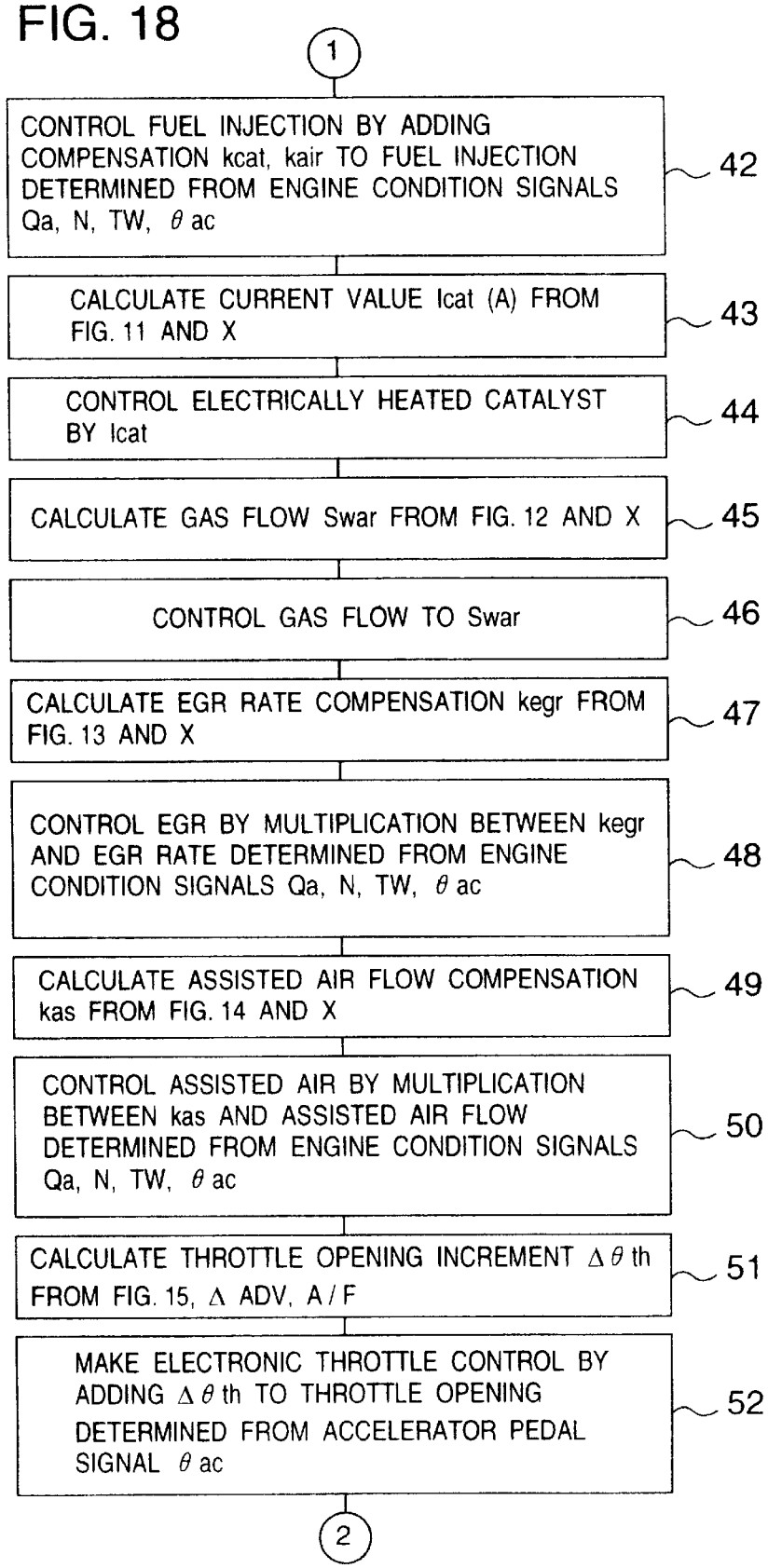
FIG. 18 is another part of the flowchart continuous to FIG. 17.
Figure 19:
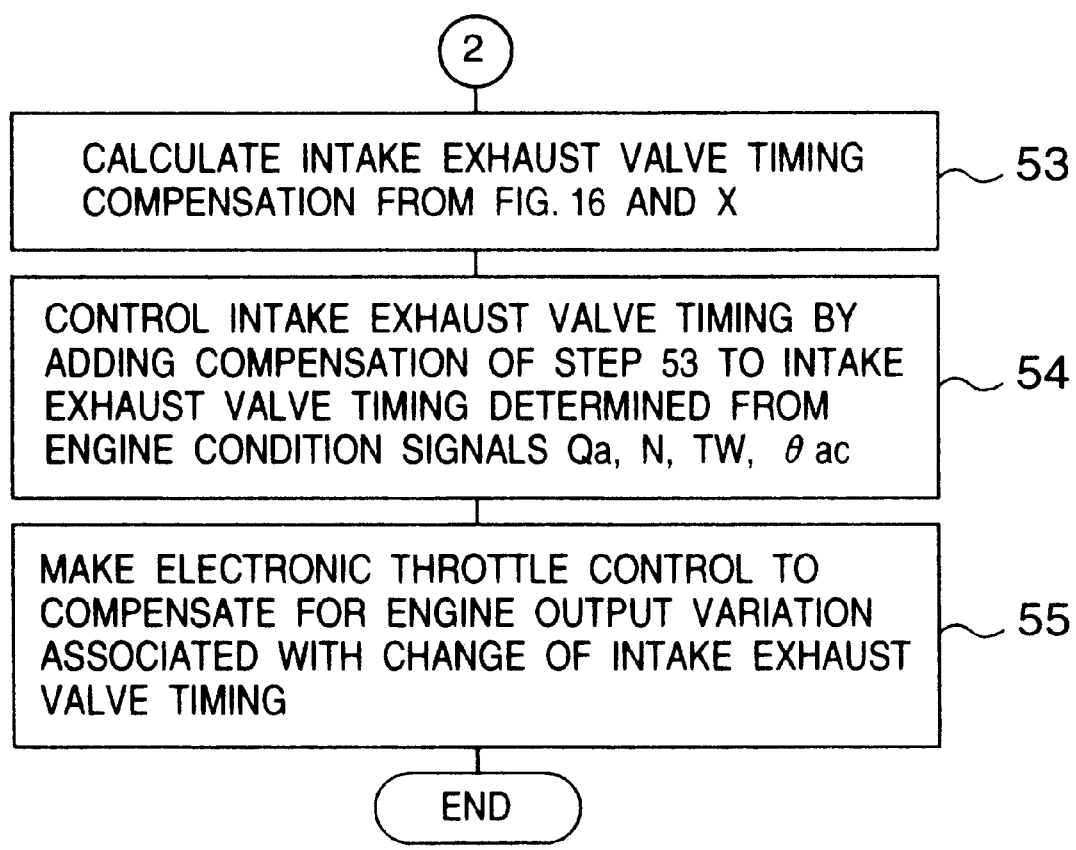
FIG. 19 is the last part of the flowchart continuous to FIG. 18.

The flowcharts showing the control operation in FIGS. 17, 18 and 19 represent one example of the flow of control in the control system according to the invention. This example will be described below.

First at step 31, engine state signals $Q_a$, N, TW and $\Theta_{ac}$ are received. At step 32, exhaust gas sensor signals $G_{exp}$, $G_{exr}$ before and after the catalyst are received, and at step 33, the correlation value of sensor signals $G_{exp}$, $G_{exr}$, amplitude ratio W, response $T_r$ or HC reduction rate is calculated. At step 34, the catalyst conversion rate X is decided from FIG. 7. At step 35, the ignition timing retard $\Delta$ ADV is decided from FIG. 8, catalyst conversion rate X and acceleration requirement d $\Theta_{ac}$/dt of accelerator pedal signal. At step 36, the ignition signal is supplied to the ignition coil 9 at the time, $\Delta$ ADV retarded from the ignition timing determined by the engine state signal. At step 37, a decision is made of whether the secondary air control is present or not. If it is present, at step 38 the secondary air control is carried out on the basis of the secondary air flow determined from FIGS. 9A and 9B and the catalyst conversion rate X. At step 39, the fuel increment compensation $K_{air}$ suitable for secondary air is determined from FIGS. 9A and 9B, and $K_{cat}$ is made zero, or $K_{cat}$=0. If the secondary air control is not present, at step 40 the fuel compensation $K_{cat}$ is determined from FIG. 10, and at step 41 the fuel increment compensation $K_{air}$ is made zero, or $K_{air}$=0. Then, the control flow advances to step 42 in FIG. 18, where compensation amounts $K_{cat}$, $K_{air}$ are added to the amount of fuel injection determined by the engine state signals $Q_a$, N, TW and $\Theta_{ac}$, and fuel injection control is made. At step 43, current value $I_{cat}$ is determined from FIG. 11, and $I_{cat}$ (A) is caused to flow in the electrically heated catalyst 18. At step 45, gas flow $S_{war}$ is determined from FIG. 12, and at step 46 the gas flow actuator 17 is controlled for $S_{war}$. At step 47, EGR rate compensation $E_{egr}$ is determined from FIG. 13. At step 48 the EGR flow determined by the engine state signal $Q_a$, N, TW and $\Theta_{ac}$ is multiplied by $K_{egr}$, and EGR control is made. At step 49, assisted air flow rate compensation $K_{as}$ is determined from FIG. 14, and the assisted air flow determined by the engine state signals $Q_a$, N, TW and $\Theta_{ac}$ is multiplied by $K_{as}$. In steps 51 and 52, the throttle opening angle compensation $\Delta \Theta_{th}$ is determined from FIG. 15 and ignition timing retard $\Delta$ ADV, A/F, and the $\Delta \Theta_{th}$ is added to the throttle opening angle determined by accelerator pedal signal $\Theta_{ac}$, and fed to the electronic throttle actuator 16. Then, the control flow advances to step 53 in FIG. 19, where the intake exhaust valve timing compensation is determined from FIG. 16 and X. At step 54, timing control is made so that the compensation calculated at step 53 is added to the intake exhaust valve timing determined by the engine state signals $Q_a$, N, TW and $\Theta_{ac}$. At step 55, electronic throttle control is made to compensate for the engine output variation associated with the change of the intake exhaust valve timing at step 54.

The secondary air control, electrically heated catalyst control, gas flow control, EGR control, assisted air control, and intake exhaust valve timing control mentioned above may be made by on-off control so that they are made on when the catalyst conversion rate (activation rate) is a certain value or below.

The catalyst conversion rate X (activation rate) in FIGS. 8, 9A, 9B, FIGS. 10 to 14, and FIG. 16 may be directly replaced by correlation factor R, HC reduction rate Y, amplitude ratio W or response $T_r$ as described in FIG. 7.

According to the invention, since the conversion rate of catalyst (activation rate) can be detected with high precision from the processed values of the exhaust gas sensor signals after catalyst or before and after catalyst, and since the emission can be most suitably controlled to reduce in accordance with the activation rate, it is possible to meet stringent exhaust gas regulations.

Also, according to the invention, the amount of the emission can be greatly reduced by implementing orderly control of ignition timing, air fuel ratio, secondly air, electrically heated catalyst, assisted air for promoting the atomization of fuel injection, EGR, gas flow within cylinder or intake exhaust valve timing of engine in the direction for promoting the catalyst activation or for reducing the emission from engine in accordance with the conversion rate or activation rate of catalyst until the catalyst is activated from the start of the engine.

We claim:

1. An internal combustion engine control device, coupled to an internal combustion engine, having a catalyst for purifying exhaust gas, an exhaust gas sensor provided downstream relative to said catalyst, and means for detecting an exhaust gas converting rate of said catalyst on the basis of an output from said exhaust gas sensor, characterized in that, until the exhaust gas converting rate of said catalyst reaches a predetermined level after the start of the engine, a first engine condition changing means is operated to change at least one of a running condition and a combustion condition of said internal combustion engine in a direction for performing at least one of quickly warming up said catalyst activation, increasing said catalyst gas converting rate and reducing emission exhausted from said internal combustion engine in accordance with the exhaust gas converting rate detected by said exhaust gas sensor, and that when said exhaust gas converting rate of said catalyst does not reach said predetermined level after the implementation of said first engine condition changing means, a second engine condition changing means is activated to make said catalyst approach said predetermined level for the exhaust gas converting rate.

2. An internal combustion engine control device according to claim 1, characterized in that control means is provided for controlling at least one of ignition timing, air fuel ratio, secondary air, electrically heated catalyst, assisted air injector for promoting atomization of fuel injection, EGR, gas flow in cylinder and intake exhaust valve timing of the internal combustion engine in the direction for performing at least one of quickly warming up said catalyst activation, increasing said catalyst conversion rate and reducing emission exhausted from said internal combustion engine on the basis of the signal from said exhaust gas sensor provided downstream relative to the catalyst under air fuel ratio control.

3. In an internal combustion engine control device according to claim 1, an exhaust gas purifying device for engine characterized in that control means is provided for controlling at least one of ignition timing, air fuel ratio, secondary air, electrically heated catalyst, assisted air injector for promoting atomization of fuel injection, EGR, gas flow in cylinder and intake exhaust valve timing of the internal combustion engine in the direction for performing at least one of quickly warming up the catalyst activation according to the calculated conversion rate of said catalyst, increasing said catalyst conversion rate or for decreasing emission exhausted from said engine on the basis of the response and varying amplitude of said signal from said exhaust gas sensor provided downstream relative to the catalyst under air fuel ratio control.

4. In an internal combustion engine control device according to claim 1, an exhaust gas purifying device for engine characterized in that when at least one of ignition timing, air fuel ratio, secondary air, electrically heated catalyst, assisted air injector for promoting atomization of fuel injection, EGR, gas flow in cylinder and intake exhaust valve timing of the internal combustion engine are controlled in the direction for performing at least one of quickly warming up the catalyst activation, increasing said catalyst conversion rate and decreasing emission exhausted from said engine, further means is provided and operated to compensate for the variation of the engine output.

* * * * *